US008933942B2

(12) United States Patent
Hartog et al.

(10) Patent No.: US 8,933,942 B2
(45) Date of Patent: Jan. 13, 2015

(54) PARTITIONING RESOURCES OF A PROCESSOR

(75) Inventors: Robert Scott Hartog, Windemere, FL (US); Ralph Clay Taylor, Deland, FL (US); Michael Mantor, Orlando, FL (US); Thomas Roy Woller, Austin, TX (US); Kevin McGrath, Los Gatos, CA (US); Rex McCrary, Oviedo, FL (US); Philip J. Rogers, Pepperell, MA (US); Mark Leather, Los Gatos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 9 days.

(21) Appl. No.: 13/315,121

(22) Filed: Dec. 8, 2011

(65) Prior Publication Data

US 2013/0147816 A1 Jun. 13, 2013

(51) Int. Cl.
| | |
|---|---|
| *G06F 15/16* | (2006.01) |
| *G06T 1/00* | (2006.01) |
| *G06F 9/46* | (2006.01) |
| *G06F 9/50* | (2006.01) |

(52) U.S. Cl.
CPC ..................................... *G06F 9/505* (2013.01)
USPC ........... 345/503; 345/501; 718/104; 718/105; 718/108

(58) Field of Classification Search
None
See application file for complete search history.

(56) References Cited

U.S. PATENT DOCUMENTS

| | | | |
|---|---|---|---|
| 7,234,144 B2 | 6/2007 | Wilt et al. | |
| 7,310,722 B2 | 12/2007 | Moy et al. | |
| 8,368,701 B2 | 2/2013 | Paltashev et al. | |
| 2007/0103474 A1 | 5/2007 | Huang et al. | |
| 2007/0103476 A1* | 5/2007 | Huang et al. .................. | 345/522 |
| 2007/0136730 A1* | 6/2007 | Wilt et al. ...................... | 718/102 |
| 2007/0240160 A1* | 10/2007 | Paterson-Jones et al. ..... | 718/104 |
| 2009/0019448 A1* | 1/2009 | Bouge et al. .................. | 718/104 |
| 2009/0217020 A1* | 8/2009 | Yourst .......................... | 712/245 |
| 2010/0122067 A1 | 5/2010 | Lindholm et al. | |
| 2011/0078427 A1 | 3/2011 | Shebanow et al. | |
| 2011/0219221 A1 | 9/2011 | Skadron et al. | |
| 2011/0314478 A1* | 12/2011 | Louise et al. ................. | 718/104 |
| 2012/0019542 A1* | 1/2012 | Shah et al. .................... | 345/522 |
| 2013/0141447 A1 | 6/2013 | Hartog et al. | |
| 2013/0191817 A1* | 7/2013 | Vorbach ........................ | 717/150 |

* cited by examiner

*Primary Examiner* — Joni Richer
*Assistant Examiner* — Yi Wang
(74) *Attorney, Agent, or Firm* — Volpe and Koenig, P.C.

(57) ABSTRACT

Embodiments describe herein provide an apparatus, a computer readable medium and a method for simultaneously processing tasks within an APD. The method includes processing a first task within an APD. The method also includes reducing utilization of the APD by the first task to facilitate simultaneous processing of the second task, such that the utilization remains below a threshold.

20 Claims, 5 Drawing Sheets

PARTITIONING RESOURCES OF A PROCESSOR

BACKGROUND

1. Field of the Invention

The present invention is generally directed to computing systems. More particularly, the present invention is directed to improving utilization of resources within a processor or computing system.

2. Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs), With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) providing quality of service (QoS) guarantees between processes, (iv) programming model, and (v) compiling to multiple target instruction set architectures (ISAs)—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

Attributes of both the discrete and single chip arrangements can also limit the types of workloads that will result in efficient execution on the GPU.

One example includes the limitations of single task launch systems. In this example, physics or artificial intelligence workloads with insufficient data parallel operations between serial reduction steps may not be able to overcome the communications overhead associated with execution on the GPU. This limitation can exist because the CPU can quickly require the results of the data parallel operations performed by the GPU. However, the high overhead of compute offload to the GPU (e.g., dispatching work to the GPU, the latency incurred in reporting results, and the possibility of having to wait for previously-issued work) often results in unacceptable performance. Unless offload overheads can be reduced, or multiple offloads can be concurrently scheduled, loss of the opportunity to accelerate fine grain data parallel workloads will occur.

In another example of single task launch system limitations, consider a workload that requires heavy register resources and also has a long executing kernel. Here, the large register usage creates sparse occupancy of the GPU compute units and, therefore, limits the latency hiding attributes the GPU normally offers. In current systems, workloads that require heavy register resources are typically larger than the average workload. These larger workloads can prevent the cooperative mixing of a different kernel with small resource requirements. In yet one other example, a low latency kernel can also fail to fully occupy the GPU's computing resources. In this scenario, some workgroups finish before all the workgroup slots can be occupied, leaving the GPU only partially utilized. Unless at least these limitations of single task launch systems can be overcome, the GPU will suffer from the inability to hide the latency of such bulky workloads.

SUMMARY OF EMBODIMENTS

What is needed, therefore, are techniques to overcome the limitations of single task launch systems, thereby improving utilization of the GPU's processing resource. Embodiments of the present invention, in certain circumstances, provide scheduling techniques to efficiently and simultaneously launch two or more tasks within an accelerated processing device. The ability to simultaneously launch two or more tasks enables full utilization of the GPU's resources.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof.

One embodiment of the present invention provides a method including processing a first task within a processor such as an APD. The method also includes reducing utilization of the processor (such as an APD) by the first task to facilitate simultaneous processing of the second task, such that the utilization remains below a threshold.

Additional features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

DETAILED DESCRIPTION OF THE EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
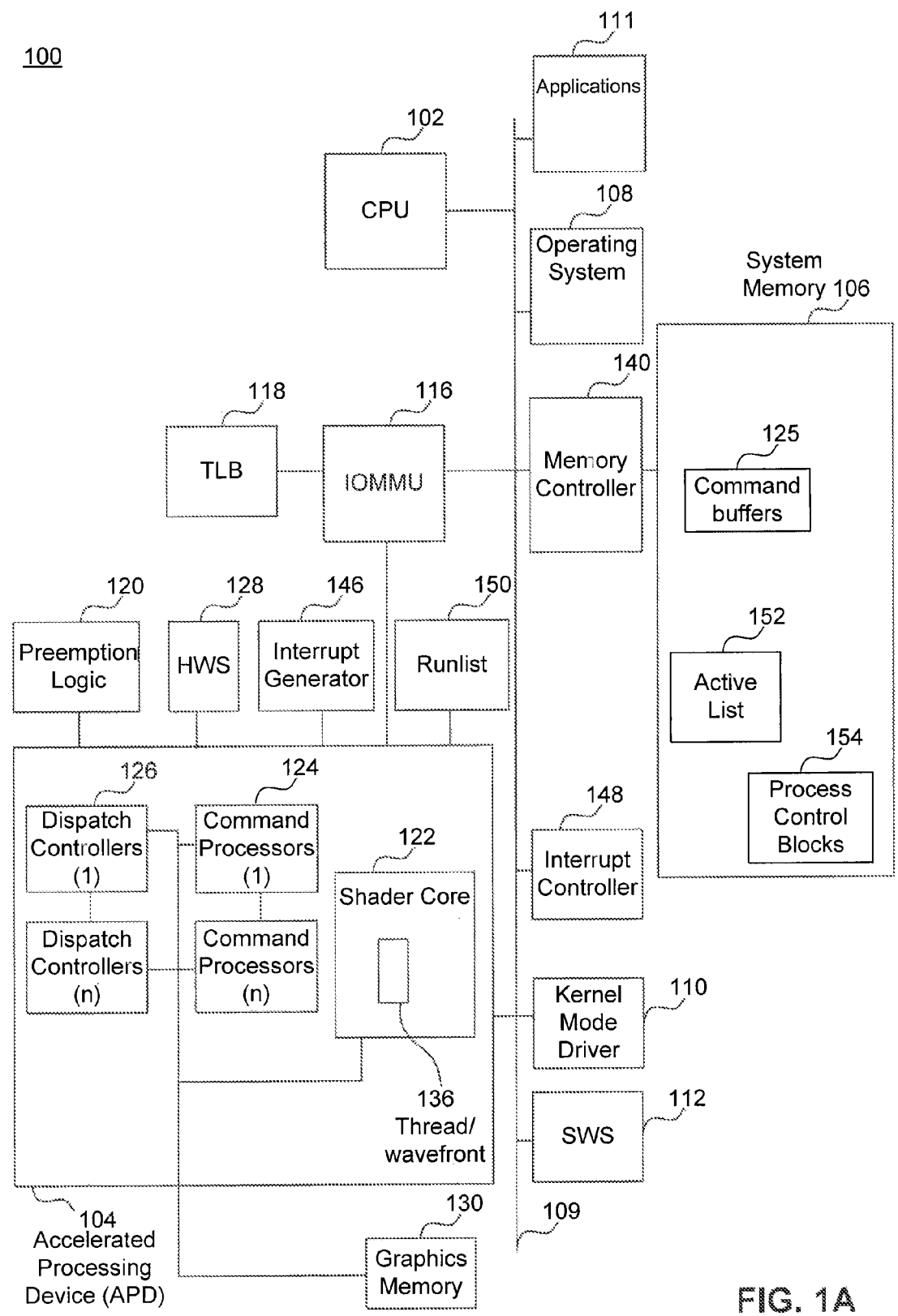
FIG. 1A is an illustrative block diagram of a processing system in accordance with embodiments of the present invention.

FIG. 1A is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface.

Device drivers, particularly on modern Microsoft Windows® platforms, can run in kernel-mode (Ring 0) or in user-mode (Ring 3). The primary benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user module only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the instruction set architecture (ISA). A command may be executed by a special processor such a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD compute unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD compute unit. This function is also referred to as a kernel, a shader, a shader program, or a program.

In one illustrative embodiment, each compute unit (e.g., SIMD processing core) can execute a respective instantiation of a particular work-item to process incoming data.

In one example, a work-item is one of a collection of parallel executions of a kernel invoked on a device by a command. A work-item is executed by one or more processing elements as part of a work-group executing on a compute unit.

A work-item is distinguished from other executions within the collection by its global ID and local ID. In one example, a subset of work-items in a workgroup that execute simultaneously together on a SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and work-group barriers.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can actually take a unique code path through the kernel. Partially populated wavefronts can be processed when a full set of work-items is not available at wavefront start time. For example, shader core 122 can simultaneously execute a predetermined number of wavefronts 136, each wavefront 136 comprising a multiple work-items.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or "n" number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a command executed by a dispatch controller that uses the context state to initiate the start of the execution of a kernel for a set of work groups on a set of compute units. DC 126 includes logic to initiate workgroups in the shader core 122. In some embodiments, DC 126 can be implemented as part of CP 124.

DC 126 includes logic to initiate wavefronts of work-items in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from run list 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 resources and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and/or a final state. An initial state is a starting point for a machine to process an input data set according to a programming order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set.

Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, operating system functions, processing logic commands, and system software can reside in memory 106. Control logic commands fundamental to operating system 108 will generally reside in memory 106 during execution. Other software commands, including, for example, kernel mode driver 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, advanced graphics port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. CPU 102 can seamlessly send selected commands for processing on the APD 104.

In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. In an illustrative embodiment, this two level run list of processes increases the flexibility of managing processes and enables the hardware to rapidly respond to changes in the processing environment. In another embodiment, information relevant for running each process on APD 104 is communicated from CPU 102 to APD 104 through process control blocks (PCB) 154.

Processing logic for applications, operating system, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
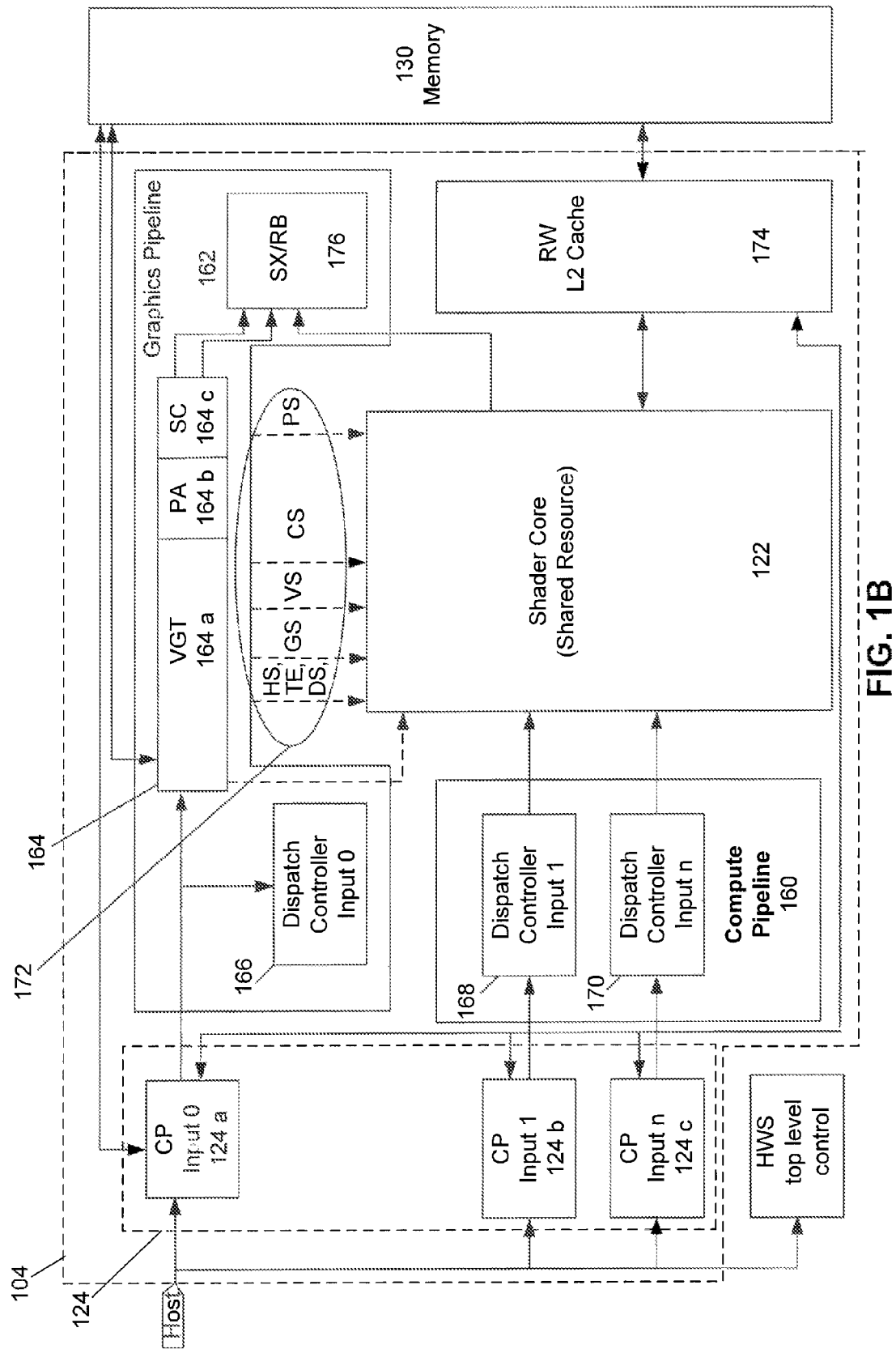
FIG. 1B is an illustrative block diagram illustration of the APD illustrated in FIG. 1A.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128, which executes information passed from various graphics blocks.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Other implementations can be used that would also be within the spirit and scope of the present invention.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a.

Compute pipeline 160 includes shader DCs 168 and 170. Each of the DCs 168 and 170 is configured to count through compute ranges within work groups received from CP pipelines 124b and 124c.

The DCs 166, 168, and 170, illustrated in FIG. 1B, receive the input work groups, break the work groups down into wavefronts, and then forward the wavefronts to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes.

After the processing of work within graphics pipeline 162 has been completed, the completed work is processed through a render back unit 176, which does depth and color calculations, and then writes its final results to memory 130.

Shader core 122 can be shared by graphics pipeline 162 and compute pipeline 160. Shader core 122 can be a general processor configured to run wavefronts. In one example, all work within compute pipeline 160 is processed within shader core 122. Shader core 122 runs programmable software code and includes various forms of data, such as state data.

A disruption in the QoS occurs when all work-items are unable to access APD resources. Embodiments of the present invention facilitate efficiently and simultaneously launching two or more tasks to resources within APD 104, enabling all work-items to access various APD resources. In one embodiment, an APD input scheme enables all work-items to have access to the APD's resources in parallel by managing the APD's workload. When the APD's workload approaches maximum levels, (e.g., during attainment of maximum I/O rates), this APD input scheme assists in that otherwise unused processing resources can be simultaneously utilized in many scenarios. A serial input stream, for example, can be abstracted to appear as parallel simultaneous inputs to the APD.

By way of example, each of the CPs 124 can have one or more tasks to submit as inputs to other resources within APD 104, where each task can represent multiple wavefronts. After a first task is submitted as an input, this task may be allowed to ramp up, over a period of time, to utilize all the APD resources necessary for completion of the task. By itself, this first task may or may not reach a maximum APD utilization threshold. However, as other tasks are enqueued and are waiting to be processed within the APD 104, allocation of the APD resources can be managed to ensure that all of the tasks can simultaneously use the APD 104, each achieving a percentage of the APD's maximum utilization. This simultaneous use of the APD 104 by multiple tasks, and their combined utilization percentages, ensures that a predetermined maximum APD utilization threshold is achieved.

Figure 2:
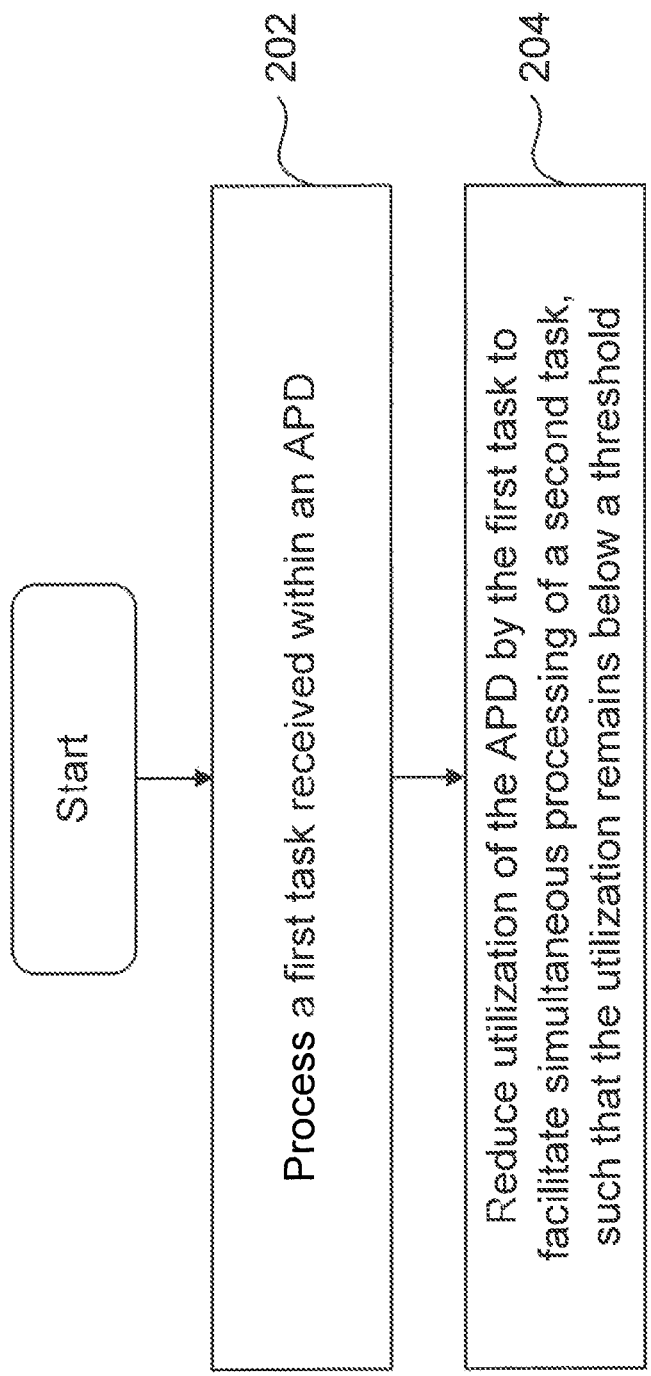
FIG. 2 is a flowchart illustrating a method for sharing resources of an APD among CPU wavefronts, according to an embodiment of the present invention.

FIG. 2 is a flowchart depicting an exemplary method 200, according to an embodiment of the present invention. The method 200 can operate on system 100 of FIGS. 1A and 1B, which is referenced throughout the description of FIG. 2. In one example, method 200 can be used for sharing resources of an APD, such as APD 104, among CPU wavefronts. The method 200 may or may not occur in the order shown, or require all of the operations.

In operation 202, a first task, including one or more wavefronts, is processed within an APD, such as APD 104. Processing of the first task can be responsive to its transmission by a CP, such as CP 124. After transmission, this first task is received as a first input to the APD.

In one exemplary embodiment, CP 124 forwards the first task to DC 126, which dispatches the plurality of wavefronts of the first task to shader core 122. By way of example, shader core 122 can include one or more SIMDs.

In the virtual environment noted above, the first task begins utilizing APD resources as it is received as the first APD input. APD resource utilization can be measured as a function of the number of SIMDs in use by the wavefronts being executed. Utilization can also be measured in view of a preset (and, in some embodiments configurable) threshold based upon dynamically measured factors or a combination of natural factors, thresholds, or other suitable means.

In one example, the first task could be the only task utilizing APD 104, and would therefore be allowed maximum utilization of all of the APD's processing resources. Depending upon the amount of work (e.g., the number of wavefronts) associated with the task, API) utilization by the first task can increase over time to achieve 100% of the APD's maximum utilization.

A determination of whether APD 104 achieves maximum utilization can be measured by comparison to a predetermined threshold. This threshold can be 100% or it could be some other percentage. On the other hand, the amount of work associated with the task might be insufficient to achieve 100% utilization of APD 104 due to the limited amount of processing required, the type of processing required or other factors.

In operation 204, utilization of the first task is reduced to facilitate simultaneous processing of a second task such that utilization of the APD is below a threshold. For example, a second task is transmitted by CP 124 to APD 104. The second task is received by APD 104 before processing of the first task concludes. By way of example, the second task can appear (e.g., virtually) as a second input to APD 104, received in parallel with the first input (i.e., the first task). That is, receipt and processing of the first and second tasks by APD 104 can convey the appearance that APD 104 has two or more physical input ports.

In operation 204, the utilization of APD 104 by the first task is monitored and compared a predetermined threshold. By way of example, communication between APD 104 and CP 124 can provide a mechanism for monitoring the utilization threshold. If the APD's utilization is below the threshold (e.g., below 100%), processing of the first and second tasks can occur simultaneously.

For example, processing of the first task might consume only 40% of APD's processing resources. In this example, the remaining 60% of the APD's processing resources will be available for completion of the second task. If processing of the second task consumes only an additional 50% of the APD's remaining processing resources, then the combined APD utilization (e.g., 90%) by the first and second tasks results in 10% of the APD's processing resources remaining unutilized. This remaining 10% can be made available to one or more additional tasks for processing in parallel with the first and second tasks.

Figure 3:
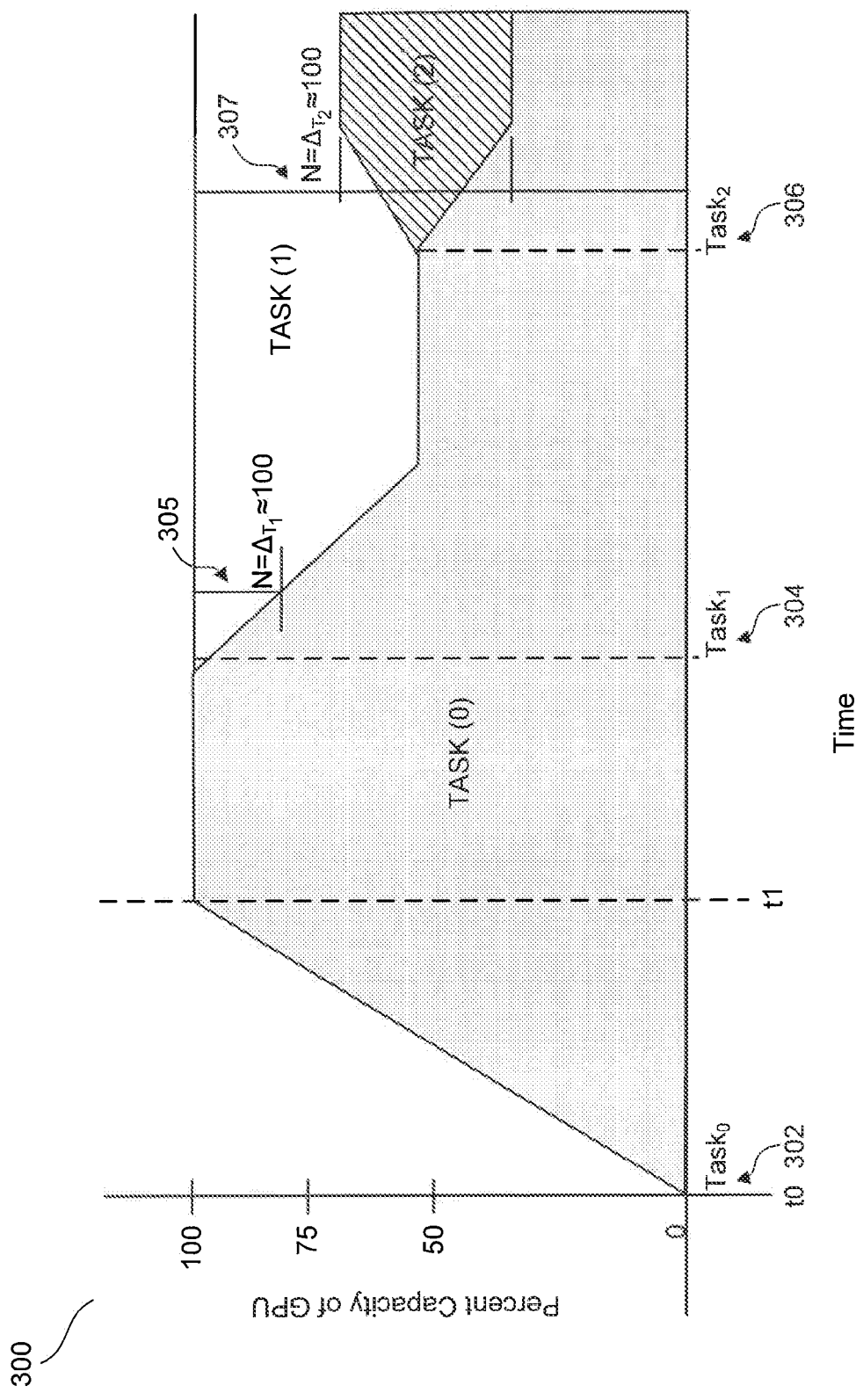
FIG. 3 is a graphical illustration of a technique for processing tasks within an APD receiving multiple CPU inputs, according to an embodiment of the present invention.

FIG. 3 is a graphical illustration 300 of a timing scheme, according to an embodiment of the present invention. More specifically graphical illustration 300 depicts a timing scheme for managing utilization of the processing resources of an APD, e.g., APD 104. Effectively managing these processing resources facilitates receipt and processing of multiple inputs to APD 104, simultaneously.

As noted above in the discussion of FIG. 2, if the APD's utilization is at or above the threshold, utilization of the APD by the first task will be reduced. In one embodiment of the present invention, the utilization of APD 104 by the first task can naturally decrease over time as wavefronts of the first task complete processing. In another embodiment, the utilization of APD 104 is reduced by careful and specific management of APD 104's processing resources.

By way of example, if the first task is the only task being processed within APD 104, and if this task is intense enough, over a period of time the first task will ramp-up to 100% utilization of the APD's resources. If the second task is scheduled to be processed within APD 104 while the first task is being processed, the CP 124 will query APD 104 resources to determine how much of the APD is being utilized by the first task. Since the first task's utilization of APD 104 is at 100%, the first task will be forced to decrease its utilization to accommodate the second task.

If, for example, the second task is allotted an APD utilization of 30%, the utilization of APD 104 by the first task will begin decreasing to 70% to accommodate the second task.

Utilization of APD 104 can be reduced, via communication between CP 124 and DC 126, by dispatching wavefronts from the first task to shader core 122. These dispatched wavefronts can be temporarily stored in memory, or they can be permanently removed from APD 104. A shader pipeline input, for example, can be used to maintain a record of which wavefronts were temporarily dispatched (i.e., context switched).

As wavefronts from the second task are enqueued for processing within APD 104, wavefronts from the first task will continue to be dispatched until the first task ramps-down to a predetermined level (e.g., 70%). As APD utilization by the first task continues to decrease to the predetermined level of 70%, APD utilization by the second task will simultaneously increase to 30%, as noted above. In this manner, by halting the processing of portions (e.g., wavefronts) of selected tasks, utilization of APD 104 can be decreased to accommodate the simultaneous processing of other tasks. This process is described in greater detail in relation to FIG. 3.

In FIG. 3, for example, graph 300 includes an illustration of a plurality of tasks starting at different times. A first task 302 (identified in FIG. 3 as "TASK (0)"), including a plurality of wavefronts, is received by APD 104. If additional tasks are not scheduled on APD 104, utilization by the first task 302 of APD 104 gradually increases over time to achieve 100% total utilization.

The first task 302 begins at a scheduled time quanta t0 utilizing near 0% of the computing capacity of APD 104. As time continues, shader core 122 receives the plurality of wavefronts of the first task 302 that are dispatched by DC 126. The wavefronts of the first task are dispatched to APD 104 until a threshold (e.g., 100%) for utilization is achieved. For example, in FIG. 3, the first task 302 achieves the maximum threshold of 100% APD utilization at a time t1.

A second task 304 (also identified in FIG. 3 as "TASK (1)") is received within APD 104 before the processing of the first task 302 concludes. The second task 304 also includes a plurality of CPU wavefronts and is allotted 50% utilization of APD 104. When the second task 304 is received by APD 104, CP 124 queries APD resources to determine the current utilization of APD 104 by the first task. Since the first task is at 100% utilization, the first task is forced to decrease APD utilization to 50% to accommodate the second task 304.

In the illustrative embodiment of FIG. 3, the first task 302 will be forced to decrease APD 104 utilization by ceasing the processing of portions of the first task 302. This decrease will begin, for example, when CP 124 communicates to DC 126 to cease the dispatch of additional wavefronts from the first task 302 until APD 104 utilization for the second task increases to 50%—its allotted utilization level.

In another example, CP 124 communicates to DC 126 to remove a plurality of wavefronts of the first task 302 to memory 130 by performing a temporary context switch. Every wavefront of the first task that is temporarily context switched to the memory 130 (i.e., pulled out of the shader core 122) increases the available capacity of APD 104.

As illustrated in FIG. 3, the utilization of APD 104 is 100% when utilization of the first task is combined with utilization of the second task during a particular time quanta. For example, delta-T 305 shows the first task 302 at substantially 75% and the second task 304 at substantially 25%. Thus, the combined utilization of APD 104 by the first task and the second task is 100%.

In FIG. 3, in one example, a third task 306 (also identified in FIG. 3 as "TASK (2)") is received by APD 104 before the processing of the first task 302 and second task 304 concludes. For example, if the first task 302 and the second task 304 are continuing to utilize APD 104, they will begin decreasing utilization when the third task 306 is received. This decrease occurs to accommodate the utilization allotted to the third task 306.

More specifically, when the third task is received by APD 104, CP 124 will communicate to DC 126 to pull wavefronts of the first task 302 and the second task 304 from shader core 122. Conversely, wavefronts from the third task 306 will be simultaneously added until the third task's allotted APD utilization is achieved. When. APD utilizations of the first task 302, the second task 304, and the third task 306 are combined during any particular instance of a time quanta, the overall utilization of the APD 104 will be at 100%. For example, delta-T 307 illustrates the first task at substantially 33% utilization, the second task at substantially 33% utilization, and the third task at substantially 33%. The combined utilization of APD 104 of the first task 302, the second task 304, and the third task 306 is 100%.

Figure 4:
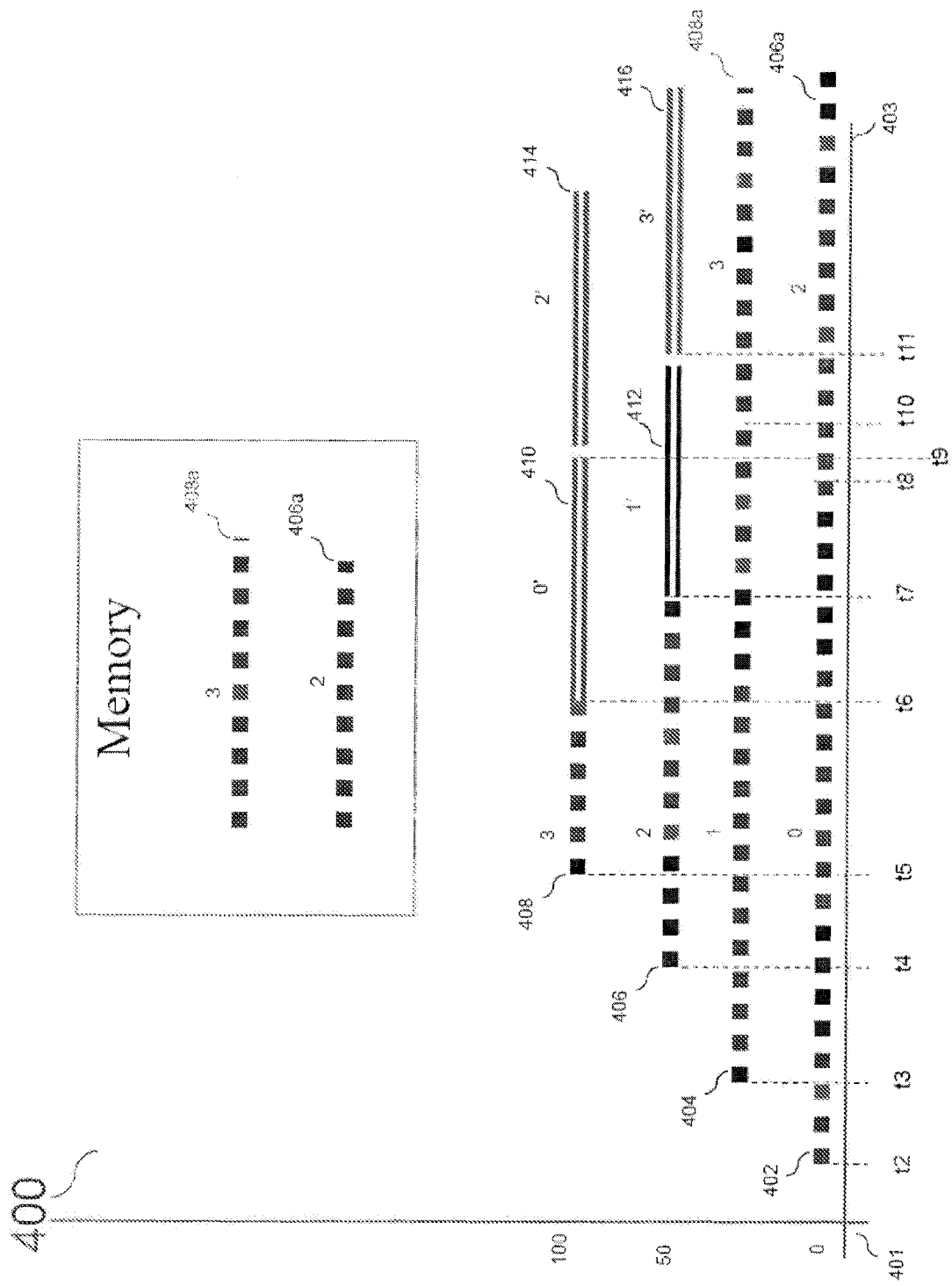
FIG. 4 is a graphical illustration of a technique for temporary context switching a portion of a wavefront on an APD, according to an embodiment of the present invention.

FIG. 4 is a graphical illustration 400 of temporary context switching in accordance with an embodiment of the present invention. More specifically, the graph 400 is an illustration of two tasks, each having four wavefronts depicted in view of an axis 401, representative of percent utilization and an axis 403, representative of time. This operation will be discussed in the context of FIG. 1A and 1B, although other systems can implement this context switching.

In FIG. 4, a first task launches the four wavefronts. If no other tasks are scheduled on APD 104, the first task increases utilization of APD 104, over a period of time, to achieve a maximum threshold, for example, 100% utilization. For example, graph 400 shows a first wavefront(0) 402, a second wavefront(1) 404, a third wavefront(2) 406, and a fourth wavefront(3) 408. The four wavefronts are launched at times t2, t3, t4, and t5, respectively. These four wavefronts combine to utilize 100% of the processing resources of APD 104.

A second task, having a plurality of wavefronts (410, 412, 414, and 416), is received as a second input to APD 104, before completion of the first task. The second task will be allotted a utilization threshold for APD 104 (e.g., 50%). To accommodate wavefronts from the second task, the two wavefronts of the first task are temporarily context switched to free up APD 104 processing capacity. For example, a first wavefront(0') 410 of the second task is launched at time t6 and a second wavefront(1') 412 of the second task is launched at time t7.

When wavefront(0') 410 is launched at t6, a remaining portion 408a of wavefront(3) 408 is removed from APD 104 (e.g., temporarily context switched) and is stored in a memory. Similarly, when wavefront(1') 412 is launched at t7, a remaining portion 406a of wavefront(2) is also temporarily context switched and stored in the memory. The removal of the remaining portions 406a and 408a from being processed within APD 104 reduces the utilization of APD 104 to facilitate processing of the wavefronts 410 and 412.

When the first wavefront(0) 402 completes processing at t8, the remaining portion 406a of wavefront(2) 406 is re-launched to resume processing. When the wavefront(0') 410 concludes processing, a third wavefront(2') 414 of the second task is launched at time t9.

When the second wavefront(1) 404 of the first task completes processing at time t10, the remaining portion 408a of the fourth wavefront(3) 408 is re-launched to resume processing. At a time t11, a fourth wavefront(3') 416 of the second task is launched.

In the manner illustrated in FIG. 4, multiple tasks can be combined to utilize 100% of the APD's resources as they are processed within APD 104 in parallel.

Although FIGS. 2-4 have been described primarily within the context of one DC 126 and one CP 124, embodiments of the present invention can be practiced using various combinations of two or more CPs and DCs, as illustrated in FIG. 1A. In one embodiment, for example, simultaneous launch from a single APD queue can be accommodated. Another embodiment can include one or more CPs, one or more DCs, and one or more queues. Another exemplary embodiment can include multiple queues, one or more CPs, and one DC. Any of these configurations can work cooperatively with the KMD 110 and the HWS 128 to create various APD input schemes for simultaneous scheduling of multiple tasks. These additional configurations are within the spirit and scope of the present invention.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
   processing a first task received by a processor within an accelerated processing device (APD); and
   reducing utilization of the processor by the first task to facilitate simultaneous processing of a second task, until the reduced utilization equals an allotted utilization of the second task, wherein a combined utilization by the first task and the second task remains below a predetermined utilization threshold.

2. The method of claim 1, wherein the first and second tasks are received from a central processing unit (CPU).

3. The method of claim 1, wherein the first and second tasks include a plurality of wavefronts.

4. The method of claim 1, wherein the threshold is determined in accordance with a number of local data shares available, or a predetermined allotment of APD resources.

5. The method of claim 1, wherein the reducing utilization of the processor is performed by removing a wavefront of a plurality of wavefronts associated with the first task and temporarily context switching the wavefront to a memory.

6. The method of claim 5, further comprising storing the wavefront of the plurality of wavefronts of the first task in the memory last one in last one out.

7. The method of claim 5, further comprising maintaining, using a shader pipeline input, a record of the wavefront of the plurality of wavefronts that is temporarily context switched.

8. The method of claim 1, wherein the threshold is determined in accordance with a number of single command memory devices in use.

9. The method of claim 1, wherein the reducing utilization of the processor is performed by ceasing processing of portions of the first task.

10. The method of claim 9, wherein the portions include one or more wavefronts from a plurality of wavefronts of the first task.

11. The method of claim 9, wherein the ceasing processing includes removing one or more last sent wavefronts from the plurality of wavefronts of the first task.

12. A non-transitory computer readable media storing commands wherein the commands when executed by a processor are adapted to process work-items on an APD to perform operations comprising:
processing a first task by the processor within the APD; and
reducing utilization of the processor by the first task to facilitate simultaneous processing of a second task, until the reduced utilization equals an allotted utilization of the second task, wherein a combined utilization by the first task and the second task remains below a predetermined utilization threshold.

13. The non-transitory computer readable media of claim 12, wherein the threshold is determined in accordance with a number of single command memory devices in use.

14. An apparatus, comprising:
a memory; and
a processor of an APD coupled to the memory, wherein the processor is configured to, based on a command stored in the memory:
process a first task; and
reduce utilization of the processor by the first task to facilitate simultaneous processing of a second task, until the reduced utilization equals an allotted utilization of the second task, wherein the combined utilization by the first task and the second task remains below a predetermined utilization threshold.

15. The apparatus of claim 14, wherein the APD receives the first and second tasks from a CPU.

16. The apparatus of claim 14, wherein the first and second tasks include a plurality of wavefronts.

17. The apparatus of claim 14, wherein the threshold is a number of local data shares available, or a predetermined allotment of APD resources.

18. The apparatus of claim 14, wherein the reduced utilization of the processor is performed by removing a wavefront of a plurality of wavefronts associated with the first task and temporarily context switching the wavefront to a memory.

19. The apparatus of claim 14, wherein the reducing utilization of the processor is performed by ceasing processing of portions of the first task, wherein the portions include one or more wavefronts from a plurality of wavefronts of the first task.

20. The apparatus of claim 19, wherein the ceasing processing includes removing one or more last sent wavefronts from the plurality of wavefronts of the first task.

* * * * *